US007043452B2

(12) United States Patent
Rothfarb (10) Patent No.: US 7,043,452 B2
(45) Date of Patent: May 9, 2006

(54) LOCK-AND-KEY CONSUMER BILLING DATA PROTECTION SYSTEM HAVING DATA ENCRYPTION CAPABILITY

(76) Inventor: Neil Barry Rothfarb, 187 Griswold Dr., West Hartford, CT (US) 06119

( * ) Notice: Subject to any disclaimer, the term of this patent is extended or adjusted under 35 U.S.C. 154(b) by 553 days.

(21) Appl. No.: 10/160,765

(22) Filed: May 31, 2002

(65) Prior Publication Data

US 2003/0217012 A1 Nov. 20, 2003

Related U.S. Application Data

(63) Continuation-in-part of application No. 10/146,249, filed on May 15, 2002, and a continuation-in-part of application No. 10/146,252, filed on May 15, 2002.

(51) Int. Cl.
*G06F 17/60* (2006.01)

(52) U.S. Cl. .................. 705/50; 705/51; 713/200; 713/165; 380/203
(58) Field of Classification Search .............. 705/50, 705/51; 713/200, 165; 380/203
See application file for complete search history.

(56) References Cited

U.S. PATENT DOCUMENTS 4,123,747 A * 10/1978 Lancto et al. ............... 713/185
6,868,403 B1 * 3/2005 Wiser et al. .................. 705/51

FOREIGN PATENT DOCUMENTS

JP 363316626 A * 12/1988

* cited by examiner

*Primary Examiner*—Pierre Eddy Elisca
(74) *Attorney, Agent, or Firm*—Patton Boggs LLP (57) ABSTRACT

A "lock-and-key" consumer billing data protection capability is provided to telemarketing and electronic marketing systems which are based upon previously-acquired consumer lists. The lists contain encrypted partial billing information for each consumer, which is insufficient to access the consumer's account. Thus, at the time a consumer is offered a product or service, the telemarketer, the electronic marketer, and any entity hired to perform billing operations for such consumer purchases all remain "locked" out from accessing the consumer's account. When the consumer wishes to authorize the purchase of an offered product or service, the consumer must provide the "key" to the consumer's account, which is the key necessary to decrypt the encrypted partial billing information and also the missing billing information not acquired from the list provider.

16 Claims, 3 Drawing Sheets

FIGURE 3

LOCK-AND-KEY CONSUMER BILLING DATA PROTECTION SYSTEM HAVING DATA ENCRYPTION CAPABILITY

CROSS REFERENCE TO RELATED APPLICATIONS

This application is a continuation in part of, and claims priority to, U.S. patent application Ser. No. 10/146,249, titled "Lock-And-Key Consumer Billing Data Protection For Electronic Marketing" and U.S. patent application Ser. No. 10/146,252 titled "Lock-And-Key Consumer Billing Data Protection For Telemarketing", both of which are filed on May 15, 2002, which are hereby incorporated by reference in their entirety.

FIELD OF THE INVENTION

The present invention relates generally to computer systems, and more particularly to computerized order entry systems that support and facilitate telemarketing and consumer electronic marketing operations.

Problem

The practice of companies offering to sell goods or services to consumers directly over the telephone, without requiring the consumer to visit a traditional ("bricks and mortar") store, is known as telemarketing. In today's business climate, telemarketing has become ubiquitous.

Historically, one of the primary problems with telemarketing was that telemarketers did not precisely target consumers who were likely to buy their products or services. Rather, telemarketers routinely employed "cold calls" in an attempt to reach a broad range of consumers. Recently, however, telemarketers have recognized that consumers and the companies providing the goods and services which they market and sell would all benefit from targeted telemarketing. Accordingly, telemarketers have begun to target their efforts to those consumers who most likely would be receptive to the specific products and/or services being offered. Specifically, a telemarketing company attempting to sell a product or service of one of its clients may acquire from a third-party a list of consumers who recently purchased other products or services. For example, a telemarketing company attempting to sell memberships in a dial-in roadside assistance service program may acquire a recent consumer list from a third-party vendor of car telephones.

In an analogous manner, direct marketers have begun to acquire lists of consumers for targeted electronic messages that contain product and/or service solicitations. For example, marketers contact consumers on-line over the Internet via electronic mail, instant messaging and the like. They are also employed in other electronic marketing systems in which, for example, marketers contact consumers with messages on their mobile phones, personal data assistants (PDAs) and the like via various wireless communications protocols.

When a consumer agrees to purchase a product or service offered by a marketer or telemarketer, in order to access that consumer's account (i.e., bill that consumer), it is necessary to possess certain "billing information." At a minimum, this billing information includes the entire number, typically sixteen digits, of the consumer's credit card. The same billing information is required regardless of whether the entity accessing the consumer's account is the marketer/telemarketer itself, the seller, or any other entity hired to perform the billing operations.

There are two general approaches presently employed to acquire this billing information necessary to access a consumer's account.

The first approach is to acquire all of a consumer's billing information from the list provider that provided the consumer list. Under this approach, a consumer's billing information is often acquired from the list provider before the consumer is contacted. Variations on this approach include acquiring a consumer's billing information only after the consumer is contacted and indicates that they want to purchase the offered product or service with the same credit used for the prior purchase (commonly referred to as a "matchback"). Under the variations of this approach, however, all of the consumer's billing information is ultimately acquired from the list provider—consumers do not need to provide any billing information themselves.

Presently, list providers sometimes transfer encrypted complete billing information to telemarketers, electronic marketers, or companies hired to perform their payment operations. This encrypted complete billing information can be decrypted only by using a cipher key provided by the list provider. Importantly, the list provider releases this cipher key without the consumer providing the telemarketer or electronic marketer any authorization or per transaction-based "key." Thus, the consumer's account can be charged even if the consumer does not reach into their wallet to provide a "key" or any other billing information.

The advantage of this approach is that it eliminates the need for consumers to transmit their credit card number. This protects consumers from transmitting billing information sufficient to access their account.

The disadvantage of this approach, however, is that consumers are not in control of their billing information. As long as a marketing/telemarketing company professes to have interpreted some response from a consumer as authorizing a purchase, the consumer's account can be charged.

The second approach is to acquire all of a consumer's billing information directly from the consumer. If a consumer wants to accept an offer to purchase a product or service, that consumer must then provide their entire credit card number to authorize the sale.

The advantage of this approach is that consumers are in control of their billing information. Without a consumer's credit card number, the consumer cannot be billed for goods and services.

The disadvantage of this approach, however, is that consumers must transmit all of their billing information. Consequently, consumers may transmit billing information sufficient to access their account to untrustworthy sales agents employed by legitimate telemarketers and/or entities that are not legitimate marketers/telemarketers. In addition, this approach produces billing mistakes due to errors in the transmission and communication of the consumers' billing information.

Therefore, given the above, what is needed is a lock-and-key consumer billing data protection capability that combines some or all of the advantages of the above-described approaches, while eliminating or reducing some or all of their respective disadvantages.

Solution

The present lock-and-key consumer billing data protection system having data encryption capability provides customer billing account security to marketing and telemarketing systems which operate using consumer lists that may be acquired from a list provider.

The lock-and-key consumer billing data protection system having data encryption capability, in one embodiment, includes a database that stores consumer records presently available to the marketer/telemarketer or acquired from a list provider, such as third-parties from whom such consumers have previously purchased goods or services. Each stored consumer record includes consumer identification information and partial billing information. The partial billing information (fewer than all of the alphanumeric characters needed to access a consumer's account) in each consumer account is encrypted, using a consumer-specific cipher key, such that the marketer/telemarketer, seller and companies hired to perform billing operations are "locked" out of every consumer's account unless they receive the decryption key from the consumer. In order to provide a simple decryption process, that does not require the previous exchange of a negotiated set of keys between the consumer and the marketer/telemarketer, a predetermined set of digits from the consumer's account is used as the key to decrypt the partial billing information stored in the database as well as to provide the missing billing information not yet stored in the database. In the case where the entirety of the consumer's billing information is encrypted, the consumer provided key is used to decrypt the consumer's billing information.

Therefore, if a consumer wishes to purchase a product or service being offered, the consumer must provide the "key" to decrypt the partial billing information stored in the consumer's account, which key is also the missing billing information not yet stored in the database. Only after the consumer supplies the "key," can the consumer be charged. Specifically, now that all the consumer's billing information has been acquired—partly from the list provider and partly from the consumer—can the consumer's account can be accessed by the marketer/telemarketer, seller or an entity hired to perform billing operations for such purchases.

One advantage of the lock-and-key consumer billing data protection system having data encryption capability is that consumers are in control of their billing information. Without receiving the missing billing information (the "key") from the consumer, no entity can bill the consumer based on an erroneous premise that authorization for a particular transaction was received. Unlike the presently employed approach of acquiring all of a consumer's billing information from a third party, the lock-and-key consumer billing data protection system having data encryption capability "locks" companies out of a consumer's account until the consumer takes the proactive step of providing the missing billing information—the "key".

Further features and advantages of the invention as well as the structure and operation of various embodiments of the lock-and-key consumer billing data protection system having data encryption capability are described in detail below with reference to the accompanying drawings.

BRIEF DESCRIPTION OF THE FIGURES

The features and advantages of the present lock-and-key consumer billing data protection system will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

Overview

The present lock-and-key consumer billing data protection system having data encryption capability relates to providing a "lock-and-key" consumer billing data protection capability to marketing and telemarketing systems. In an embodiment, a marketer/telemarketer selling particular good(s) and/or service(s) acquires a list of consumers (typically from a list provider) or has in its possession a list of consumers. This list typically identifies consumers who have previously purchased goods and/or services, thus allowing for targeted sales.

Such consumer lists presently available or transferred from the list provider contain only partial billing information (p alphanumeric characters of the m+p alphanumeric character consumer billing information) for each consumer. That is, the partial billing information comprises a predetermined subset of data from the consumer's complete billing data, and fails to include the entirety of the billing data. One such example is a string of consecutive digits of the consumer's account number. Because complete billing information is needed to access a consumer's account, the present lock-and-key consumer billing data protection system having data encryption capability "locks" out the marketer/telemarketer, the seller, and even an entity hired to perform billing operations for such purchases from accessing the consumer's account.

When a consumer takes a proactive step to unambiguously order the offered product(s) and/or service(s), the lock-and-key consumer billing data protection system having data encryption capability requires that they provide only certain numbers from their credit cards—the "key"—in order to authorize the purchase. This is done without allowing access to the consumer's partial billing information previously stored in the database system. The marketer/telemarketer, seller, or company hired to perform billing operations, however, now has all of the consumer's billing information and, as a result, can access that consumers account.

Lock-and-key consumer billing data protection empowers consumers with the ability to buy goods and services while controlling access to their account and eliminating the need to transmit all of their billing information. Thus, lock-and-key consumer billing data protection guards against consumers being billed for products or services whose purchase they did not, nor intend to, authorize by requiring consumers to take the affirmative, proactive step of communicating part of their billing information to authorize a purchase.

The consumer can directly contact the marketer/telemarketer to initiate an inbound communication session, or the telemarketer can contact the consumer to initiate an outbound communication session, and both cases can follow the sale of another product or service.

The present lock-and-key consumer billing data protection system having data encryption capability is described in terms of the above examples. This is for convenience only and is not intended to limit the application of the present lock-and-key consumer billing data protection system having data encryption capability. In fact, after reading the following description, it will be apparent to one skilled in the relevant art(s) how to implement the lock-and-key consumer billing data protection system having data encryption capability in alternative embodiments.

Glossary

Below are definitions of terms used herein. In the event that a term defined herein has a more common meaning or usage, the definition provided herein should be taken as the intended meaning.

"Billing information" means the minimum data needed in order to charge or otherwise gain access to a consumer's account, such as a credit card, checking, savings, share or similar account, utility bill, mortgage loan account or debit card. In most instances, such minimum information is a set of alphanumeric characters, such as the typical sixteen-digit credit card account number.

"Credit card" means any debit, prepaid, charge, or credit card (whether private label or bank issued), or plate, coupon book or other credit device existing for the purpose of obtaining money, property, labor, or services as authorized by the consumer in whose name the credit card is issued.

"Consumer" means any person who is or may be required to pay for goods, services or a charitable contribution offered or solicited through telemarketing.

"Consumer identification information" means the data used to contact a consumer (e.g. name, telephone number, street address, electronic mail address, etc.).

"List Provider" means an entity that provides a list of consumers for use in sales activities. The list typically identifies consumers who recently purchased other products or services and typically includes only partial billing information (p alphanumeric characters of the m+p alphanumeric character consumer billing information) for each consumer, as noted above.

"Seller" means any person who provides, offers to provide, or arranges for others to provide goods or services to the consumer in exchange for consideration. For simplicity of description, the term "marketer/telemarketer" is used herein to include the instances where the marketer/telemarketer is also the seller, since such a distinction is unnecessary for the purpose of describing the operation of the lock-and-key consumer billing data protection system having data encryption capability.

"Marketer" means any person who, in connection with marketing activities (plans, programs or campaigns which are conducted to induce the purchase of goods or services or charitable contributions) initiates or receives electronic communications (electronic mail, instant or text messages and the like) to or from a consumer.

"Telemarketer" means any person who, in connection with telemarketing, initiates or receives telephone calls to or from a consumer. Further, the terms "user," "telemarketer," "telemarketing company," "entity," and the plural form of these terms are used interchangeably throughout herein to refer to those who would access, use, and/or benefit from the lock-and-key consumer billing data protection capability provided to telemarketing systems as described herein.

"Telemarketing" means a plan, program or campaign which is conducted to induce the purchase of goods or services or a charitable contribution, by use of one or more telephones.

Lock-and-Key System

Figure 1:
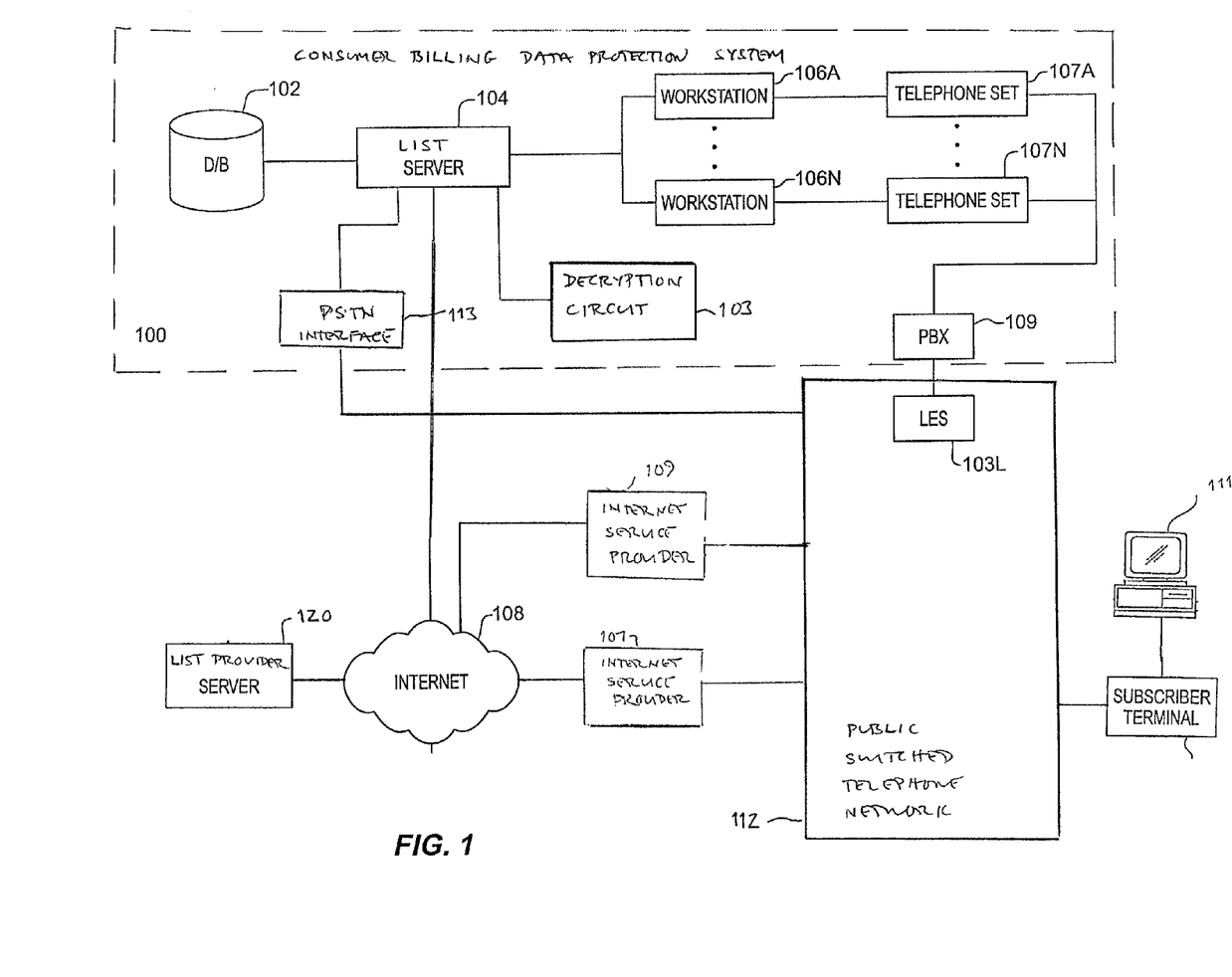
FIG. 1 is a block diagram illustrating the architecture of a lock-and-key consumer billing data protection system having data encryption capability and an environment in which it is operational.

FIG. 1 is a block diagram that illustrates the architecture of a lock-and-key consumer billing data protection system having data encryption capability 100, termed "consumer billing data protection system" herein. FIG. 1 highlights the connectivity among the various data management components of the consumer billing data protection system 100 without providing all of the details of the typical apparatus that is specifically used to employ this system in either telemarketing or electronic marketing activities. The above-noted co-pending patent applications provide the details of such apparatus and also provide flow diagrams that illustrate the typical operation of these apparatus.

Consumer billing data protection system 100 includes a repository database 102. Database 102, in an embodiment, is a computer running database management server software with physical media which acts as a central store for information within consumer billing data protection system 100. That is, database 102 stores the consumer lists presently available to the marketer/telemarketer or received from a list provider, including the consumer records containing consumers' identification information, the partial billing information, any key received from a consumer and possibly any collected demographic information. In an alternate embodiment, database 102 would only store records containing consumers' contact and demographic information. That is, a seller retains the partial billing information (except for the name of the credit card) for added consumer protection.

Returning to FIG. 1, a list server 104 is the data processor of consumer billing data protection system 100, and is connected to database 102. List server 104 allocates, distributes and provides the data stored in database 102 to, in the telemarketing embodiment, a plurality of workstations 106 (shown in FIG. 1 as workstations 106A–106N) used by a plurality of sales agents employed by a telemarketer. In this embodiment, list server 104 provides workstations 106 with graphical user interface (GUI) "front-end" screens to present certain data in the consumer records (one at a time) during the telemarketing process. In the electronic marketing embodiment, list server 104 retrieves certain data that is stored in database 102 and uses this data to originate electronic communications via electronic mail, instant messaging, text messages and the like to identified consumers in a well-known fashion.

Each of the plurality of sales agents is also equipped with a telephone station set 107 (shown in FIG. 1 as 107A–107N) and the list server 104 is capable of originating outgoing telephone calls. Assuming for the purpose of the description herein that the sales agents are equipped with telephone station sets 107, a Private Branch exchange (PBX) 109 functions to interconnect the telephone station sets 107 via trunks with a Local Exchange System (LES) 103L. Local Exchange System 103L is part of the Public Switched Telephone Network (PSTN) 112. This allows the sales agents to originate calls to identified consumers in a well-known fashion.

Alternatively, the list server 104 can originate electronic messages for transmission to the consumers personal computer 111 via the Internet 108. In this mode, the list server 104 generates an electronic message addressed to the consumer at their Internet e-mail address and transmits this message via a communications connection from list server 104 directly via the Internet 108 or to an Internet Service Provider 109 with whom the consumer billing data protection system 100 has an account. The Internet Service Provider 109 receives the electronic message and forwards the electronic message via the Internet 108 to the Internet Service Provider 107 with whom the consumer has an account. When the consumer connects to this Internet Service Provider 107 from their personal computer 111, the Internet Service Provider 107 delivers the electronic message to the consumer. The consumer can have access to the Internet 108 in many ways, such as via the Public Switched Telephone Network 105, cable modem, high speed data connection, satellite communications, and the like.

List server 104 also allows consumer billing data protection system 100 to store presently available consumer lists or to receive the consumer lists from a list provider. That is, a plurality of servers, such as list provider server 120 belonging to list providers may be authorized to access consumer billing data protection system 100 via the public, global Internet 108. (FIG. 1, however, shows only one list provider server 120 for ease of explanation herein.) Such list provider servers would then transfer consumer records to consumer billing data protection system 100 for storage onto database 102 under the control (authorization, scheduling, validation, etc.) of list server 104. In an alternate embodiment, list provider servers 120 would access consumer billing data protection system 100 via a dial-in line over the Public Switched Telephone Network (PSTN) 112, rather than the global Internet 108, to PSTN Interface 103. In alternate embodiments, list server 104 receives and loads such consumer records from removable storage media.

Regardless of the mode used to transfer the consumer list, the consumer list comprises a plurality of consumer records, at least a portion of each being encrypted using conventional encryption techniques to safeguard the contents. The encryption process requires the use of a consumer-specific decryption key in order to access this information. In order to provide a simple decryption process, that does not require the previous exchange of a negotiated set of keys between the consumer and the marketer/telemarketer, a predetermined set of digits from the consumer's account is used as the key to decrypt the partial billing information stored in the database as well as to provide the missing billing information not yet stored in the database. In the case where the entirety of the consumer's billing information is encrypted, the consumer provided key is used to decrypt the consumer's billing information.

Encryption of the Consumer's Partial Billing Information

In one embodiment, a consumers partial billing information is encrypted prior to being transferred from a list provider to telemarketers, electronic marketers, or companies hired to perform their payment operations. This encrypted partial billing information can be decrypted only by using the "key" (e.g. the last four digits of the account number) that the consumer provides as a means of authorizing a purchase. In an alternate embodiment utilizing encryption, the list provider encrypts and transfers the consumer's complete billing information, and the "key" can be used to decrypt this complete billing information. In any event, the telemarketer, electronic marketer, or company hired to perform their payment operations is able to access the consumer's account only if it receives the consumer provided "key." Without the consumer providing this "key" to the telemarketer or electronic marketer, it is impossible to access the encrypted information.

Encryption of the Consumer's Partial Billing Information and Matchback

Alternate embodiments to lock-and-key consumer billing data protection for telemarketing and electronic marketing also include systems utilizing a "matchback" procedure. In one embodiment, a list provider transfers to a telemarketer or electronic marketer only information used to identify a consumer and to identify the credit card previously used by the consumer (e.g. type of credit card, expiration date, the first four digits of the account number, etc.), but does not transfer information sufficient to access the consumer's account. If the telemarketer or electronic marketer sends to the list provider the "key" provided by the consumer (e.g. the last four digits of the account number) and this "key" matches the corresponding part of the billing information on file with the list provider, then the list provider transfers back to the telemarketer or electronic marketer the complete billing information needed to access the consumer's account. In an alternate embodiment utilizing a "matchback" procedure, if the telemarketer or electronic marketer sends to the list provider the "key" provided by the consumer (e.g. the last four digits of the account number) and if this "key" matches the corresponding part of the billing information on file with the list provider, then the list provider transfers back to the telemarketer or electronic marketer partial billing information which can be used in conjunction with the "key" to access the consumer's account. In any event, no consumer's account is accessed unless that consumer reached into their wallet and provided the "key" to that account to the telemarketer or electronic marketer. In both of these cases, the customer billing information can be encrypted with a customer-specific encryption code and the "key" provided by the customer can then be used to decrypt the customer billing information in order to provide additional security.

In yet another alternate embodiment utilizing a "matchback" procedure, the list provider transfers complete billing information to the company hired to perform their payment operations for the telemarketer or electronic marketer. This payment company does not charge any consumer's account, however, unless this payment company receives from the telemarketer or electronic marketer the consumer's "key" (that the consumer provided the telemarketer or electronic marketer as a means of authorizing a purchase) and said "key" matches the corresponding part of the billing information on file with this payment company. Again, no consumer's account is accessed unless that consumer reached into their wallet and provided the "key" to that account to the telemarketer or electronic marketer.

Lock-and-Key Decryption/Matchback Process

Figure 2:
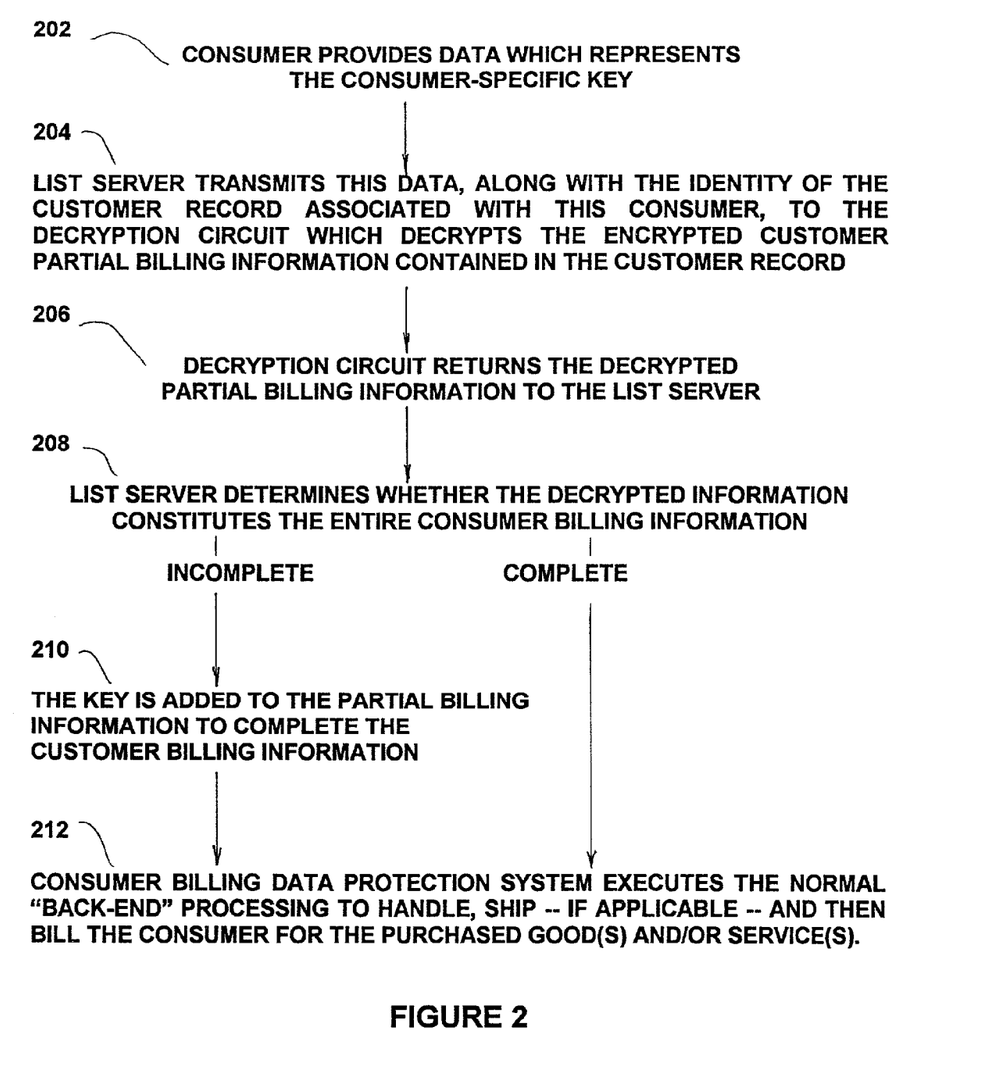
FIGS. 2 and 3 are a flow charts depicting the operation of a lock-and-key consumer billing data protection system having data encryption capability.
Figure 3:
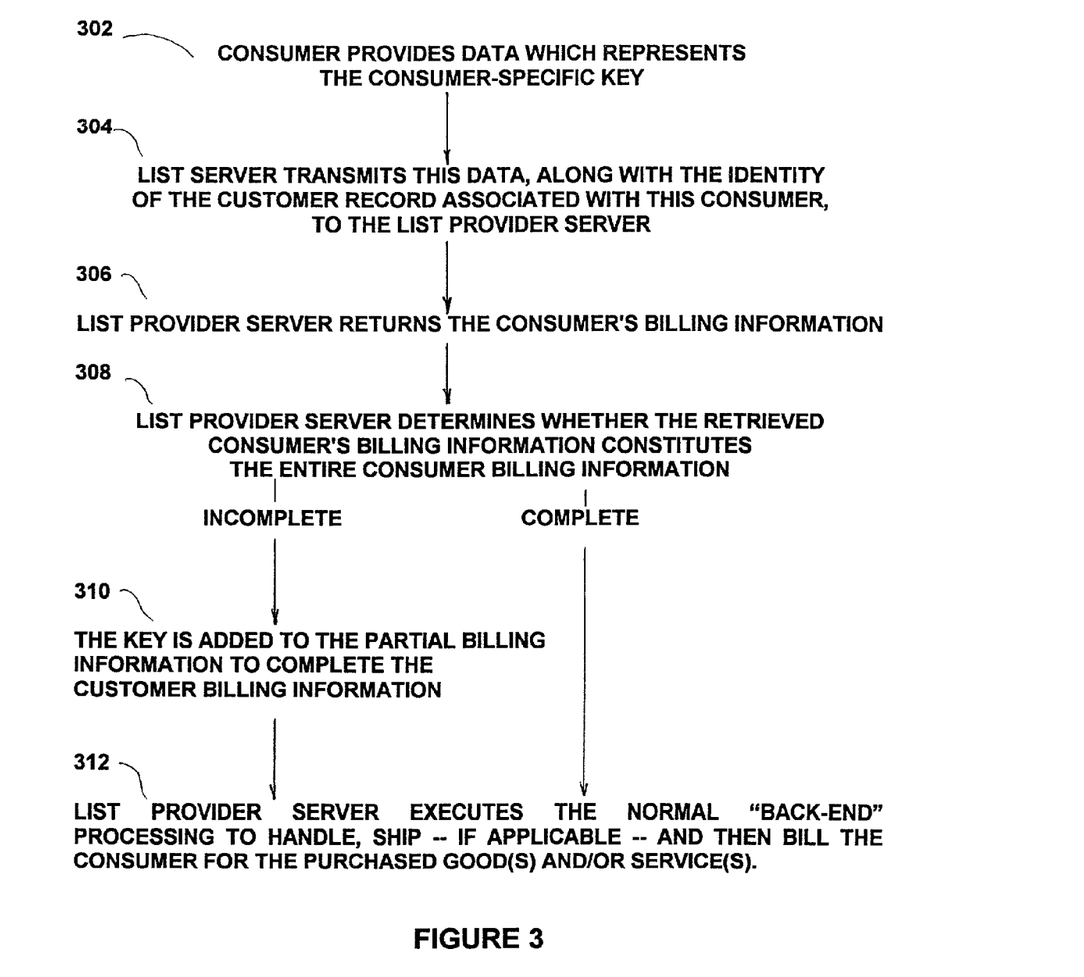

FIGS. 2 and 3 are a flow charts depicting, respectively, the consumer record decryption and matchback portion of the operation of the consumer billing data protection system 100. This process is collectively termed the billing data decryption process, which illustrates the order-entry functionality, consumer security and other advantages of consumer billing data protection system 100.

In the various alternative embodiments noted above, the location of the consumer's partial/complete billing information and the processing of the received consumer order can be effected in any of a number of manners and in any of a number of locations. In order to illustrate the operation of the decryption process using the lock and key paradigm, the decryption process is described in the flow chart of FIG. 2 in the context of the marketer/telemarketer having the consumer record stored in database 102, which consumer record includes partial billing information, which is encrypted using a consumer-specific cipher key. The encrypted partial billing information can be decrypted only by the use of the key provided by the consumer, and the key also constitutes the missing portion of the consumer's partial billing information.

In this embodiment of lock-and-key consumer billing data protection, the key is m alphanumeric characters of the m+p alphanumeric character billing information where consumer billing data protection system 100 has previously stored the p alphanumeric characters in encrypted form in list server 104. In an alternate embodiment, the key is the missing m alphanumeric characters of the m+p alphanumeric character credit card billing information in addition to other data unique to the consumer or the consumer's account (such as the ACS code commonly located on credit cards), and this additional information need not be part of the billing information needed to access consumers' account.

Upon receipt of data at step 202 from the consumer which represents the key, the m alphanumeric characters of the m+p alphanumeric character billing information, the list server 104 transmits this data, along with the identity of the customer record associated with this consumer, to the decryption circuit 103 which uses the key to decrypt the encrypted customer partial billing information contained in the customer record at step 204. At step 206, the decryption circuit 103 returns the decrypted partial billing information to the list server 104 and the list server at step 208 determines whether the decrypted information constitutes the entire consumer billing information. If not, at step 210 the key is added to the partial billing information to complete the customer billing information. Once the key has been provided, the consumer billing data protection system 100 at step 212 executes the normal "back-end" processing to handle, ship—if applicable—and then bill the consumer for the purchased good(s) and/or service(s).

In order to illustrate the operation of another embodiment of the decryption process using the lock and key paradigm, the decryption process is described in the flow chart of FIG. 3 in the context of the list provider having the consumer record stored in list provider server 120, which consumer record includes partial or complete billing information, which is optionally encrypted using a consumer-specific cipher key. The list provider server 120 in this case performs the tasks noted above with respect to the consumer billing data protection system 100, as modified to accommodate the matchback process and constitutes a significant element of the consumer billing data protection system 100. The consumer billing information, if encrypted, can be decrypted only by the use of the key provided by the consumer, and the key, in the case of partial billing information, also constitutes the missing portion of the consumer's partial billing information. In the pure matchback process, the key is the consumer-specific billing information data that is provided by the consumer and without which the sales process cannot be completed.

In this embodiment of lock-and-key consumer billing data protection, the key is m alphanumeric characters of the m+p alphanumeric character billing information. In an alternate embodiment, the key is the missing m alphanumeric characters of the m+p alphanumeric character credit card billing information in addition to other data unique to the consumer or the consumer's account (such as the ACS code commonly located on credit cards), and this additional information need not be part of the billing information needed to access consumers' account. The telemarketer/marketer only has information used to identify a consumer and to identify the credit card previously used by the consumer.

Upon receipt at the list server 104 of data at step 302 from the consumer which represents the key, the m alphanumeric characters of the m+p alphanumeric character billing information, the list server 104 transmits this data, along with the identity of the customer record associated with this consumer, to the list provider server 120 which uses the key to match with the customer billing data stored in the list provider server 120 and optionally decrypt the encrypted customer partial billing information contained in the customer record at step 304. At step 306, the list provider server 120 returns the consumer's retrieved billing information and at step 308 determines whether the information constitutes the entire consumer billing information. If not, at step 310 the key is added to the partial billing information to complete the customer billing information. Once the key has been provided, the list provider server 120 at step 312 executes the normal "back-end" processing to handle, ship—if applicable—and then bill the consumer for the purchased good(s) and/or service(s).

Conclusion

While various embodiments of the present lock-and-key consumer billing data protection system having data encryption capability have been described above, it should be understood that they have been presented by way of example, and not limitation. It will be apparent to persons skilled in the relevant art(s) that various changes in form and detail can be made therein without departing from the spirit and scope of the invention. Thus, the present lock-and-key consumer billing data protection system having data encryption capability should not be limited by any of the above-described exemplary embodiments, but should be defined only in accordance with the following claims and their equivalents.

What is claimed is:

1. A method for providing a consumer billing data protection capability comprising the steps of:
storing in a computer system a plurality of consumer records, each of which includes consumer identification information and encrypted partial billing information comprising a predetermined set of p alphanumeric characters of the billing information of said consumer;
processing at said computer system an order received from a consumer, comprising:
receiving an input indicative that a consumer, corresponding to said consumer identification information stored in one of said plurality of consumer records, desires to purchase a product or service, said input including a key received from said consumer, comprising the remaining m alphanumeric characters of the billing information of said consumer, and wherein m+p is epual to the total number of alphanumeric characters in the billing information of said consumer;
decrypting, using said key received from said consumer, said encrypted partial billing information stored in said one of said plurality of consumer records; and
processing an order for said product or service and billing for said order using the decrypted partial billing information stored in said one of the plurality of consumer records, and said key.

2. The method of claim 1 wherein said key includes the Authenticated Content Signing (ACS) code of a credit card.

3. A method for providing a consumer billing data protection capability in a system, comprising the steps of:
storing in a computer system a plurality of consumer records, each of which includes consumer identification information and encrypted partial billing information comprising a predetermined set of p alphanumeric characters of the billing information of said consumer;
processing at said computer system an order received from a consumer, comprising:
receiving an input indicative that a consumer, corresponding to said consumer identification information stored in said one of said plurality of consumer records, desires to purchase a product or service, said input including a key received from said consumer, comprising the remaining m alphanumeric characters of the billing information of said consumer, and wherein m+p is equal to the total number of alphanumeric characters in the billing information of said consumer;

decrypting, using said key received from said consumer, said encrypted partial billing information stored in said one of said plurality of consumer records; and processing an order for said product or service and billing for said order using said partial billing information stored in said one of said plurality of consumer records, and said key.

4. The method of claim 3 further comprising:

receiving data, comprising said plurality of consumer records, transmitted by a list provider.

5. The method of claim 4 wherein said key includes the Authenticated Content Signing (ACS) code of a credit card.

6. A system for providing a consumer billing data protection capability in a system that stores a plurality of consumer records, each of which includes consumer identification information and encrypted partial billing information comprising a predetermined set of p alphanumeric characters of the billing information of said consumer, comprising:

means for receiving an input indicative that a consumer, corresponding to said consumer identification information stored in one of said plurality of consumer records, desires to purchase a product or service, said input including a key received from said consumer, comprising the remaining m alphanumeric characters of the billing information of said consumer, and wherein m+p is equal to the total number of alphanumeric characters in the billing information of said consumer;

means for decrypting, using said key received from said consumer, said encrypted partial billing information stored in said one of said plurality of consumer records; and means for processing an order for said product or service and billing for said order using the decrypted partial billing information stored in said one of the plurality of consumer records, and said key.

7. The system of claim 6 wherein said key includes the Authenticated Content Signing (ACS) code of a credit card.

8. A system for providing a consumer billing data protection capability in a system, comprising:

database means for storing a plurality of consumer records, each of which includes consumer identification information and encrypted partial billing information comprising a predetermined set of p alphanumeric characters of the billing information of said consumer;

list server means for receiving an input indicative that a consumer, corresponding to said consumer identification information stored in said one of said plurality of consumer records, desires to purchase a product or service, said input including a key received from said consumer, comprising the remaining m alphanumeric characters of the billing information of said consumer, and wherein m+p is equal to the total number of alphanumeric characters in the billing information of said consumer;

decryption means decrypting, using said key received from said consumer, said encrypted partial billing information stored in said one of said plurality of consumer records; and means for processing an order for said product or service and billing for said order using said partial billing information stored in said one of said plurality of consumer records, and said key.

9. The system of claim 8 further comprising:

means for receiving data, comprising said plurality of consumer records, transmitted by a list provider.

10. The method of claim 9 wherein said key includes the Authenticated Content Signing (ACS) code of a credit card.

11. A method for providing a consumer billing data protection capability comprising the steps of:

storing in a computer system a plurality of consumer records, each of which includes consumer identification information and encrypted partial billing information comprising a predetermined set of p alphanumeric characters of the billing information of said consumer;

processing at said computer system an order received from a consumer, comprising:

receiving an input indicative that a consumer, corresponding to said consumer identification information stored in one of said plurality of consumer records, desires to purchase a product or service, said input including a key received from said consumer, comprising the remaining m alphanumeric characters of the billing information of said consumer, and wherein m+p is equal to the total number of alphanumeric characters in the billing information of said consumer;

accessing, using said key received from said consumer, said consumer billing information stored in said one of said plurality of consumer records; and processing an order for said product or service and billing for said order using the consumer billing information stored in said one of the plurality of consumer records, and said key.

12. The method of claim 11 wherein said key includes the Authenticated Content Signing (ACS) code of a credit card.

13. The method of claim 11 further comprising:

storing a plurality of consumer records, each of which includes consumer identification information and consumer billing information.

14. A system for providing a consumer billing data protection capability in a system that stores a plurality of consumer records, each of which includes consumer identification information and consumer billing information comprising a predetermined set of p alphanumeric characters of the billing information of said consumer, comprising the steps of:

means for receiving an input indicative that a consumer, corresponding to said consumer identification information stored in one of said plurality of consumer records, desires to purchase a product or service, said input including a key received from said consumer, comprising the remaining m alphanumeric characters of the billing information of said consumer and wherein m+p is equal to the total number of alphanumeric characters in the billing information of said consumer;

means for accessing, using said key received from said consumer, said consumer billing information stored in said one of said plurality of consumer records; and means for processing an order for said product or service and billing for said order using the consumer billing information stored in said one of the plurality of consumer records, and said key.

15. The system of claim 14 wherein said key includes the Authenticated Content Signing (ACS) code of a credit card.

16. The system of claim 14 further comprising:
means for storing a plurality of consumer records, each of which includes consumer identification information and consumer billing information.

* * * * *